United States Patent
Williams, Jr. et al.

(10) Patent No.: US 7,626,987 B2
(45) Date of Patent: Dec. 1, 2009

(54) USING ORDERED LOCKING MECHANISMS TO MAINTAIN SEQUENCES OF ITEMS SUCH AS PACKETS

(75) Inventors: John J. Williams, Jr., Pleasanton, CA (US); John Andrew Fingerhut, Campbell, CA (US); Kenneth Harvey Potter, Jr., Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 1170 days.

(21) Appl. No.: 10/706,704

(22) Filed: Nov. 12, 2003

(65) Prior Publication Data

US 2005/0100017 A1  May 12, 2005

(51) Int. Cl.
H04L 12/56 (2006.01)
(52) U.S. Cl. .......................................... 370/394; 707/8
(58) Field of Classification Search ................. 370/394; 707/8; 718/107
See application file for complete search history.

(56) References Cited

U.S. PATENT DOCUMENTS

| | | | |
|---|---|---|---|
| 5,682,537 A | 10/1997 | Davies et al. | |
| 5,699,500 A | 12/1997 | Dasgupta | |
| 6,161,144 A | 12/2000 | Michaels et al. | |
| 6,163,856 A * | 12/2000 | Dion et al. | 714/4 |
| 6,170,025 B1 | 1/2001 | Drottar et al. | |
| 6,405,274 B1 | 6/2002 | Chan | |
| 6,411,983 B1 * | 6/2002 | Gallop | 718/104 |
| 6,473,849 B1 | 10/2002 | Keller et al. | |
| 6,529,983 B1 | 3/2003 | Marshall et al. | |
| 6,920,447 B2 * | 7/2005 | Pudipeddi et al. | 707/3 |
| 7,304,999 B2 | 12/2007 | Sukonik et al. | |
| 7,313,557 B1 * | 12/2007 | Noveck | 707/8 |
| 2002/0080789 A1 | 6/2002 | Henderson et al. | |
| 2004/0143712 A1 | 7/2004 | Armstrong et al. | |
| 2005/0015686 A1 * | 1/2005 | Atoji et al. | 714/100 |
| 2005/0100017 A1 | 5/2005 | Williams et al. | |
| 2005/0216461 A1 | 9/2005 | Williams et al. | |
| 2005/0220112 A1 | 10/2005 | Williams et al. | |
| 2006/0179156 A1 | 8/2006 | Eatherton et al. | |
| 2006/0179204 A1 | 8/2006 | Cohen et al. | |
| 2007/0014240 A1 | 1/2007 | Kumar et al. | |
| 2007/0022429 A1 | 1/2007 | Rosenbluth et al. | |
| 2007/0198792 A1 | 8/2007 | Dice et al. | |

OTHER PUBLICATIONS

Couloirs et al., Transactions and Concurrency Control, Distributed Systems Concepts and Design, Addison-Wesley Publishers, Third Ed., 2001, Ch. 12, pp. 465-514.

* cited by examiner

Primary Examiner—Min Jung
(74) Attorney, Agent, or Firm—The Law Office of Kirk D. Williams

(57) ABSTRACT

Sequences of items may be maintained using ordered locks. These items may correspond to anything, but using ordered locks to maintain sequences of packets may be particularly useful. One implementation uses a locking request, acceptance, and release protocol. One implementation associates instructions with locking requests such that when a lock is acquired, the locking mechanism executes or causes to be executed the associated instructions as an acceptance request of the lock is implied by the association of instructions (or may be explicitly requested). In some applications, the ordering of the entire sequence of packets is not required to be preserved, but rather only among certain sub-sequences of the entire sequence of items, which can be accomplished by converting an initial root ordered lock (maintaining the sequence of the entire stream of items) to various other locks (each maintaining a sequence of different sub-streams of items).

51 Claims, 14 Drawing Sheets

USING ORDERED LOCKING MECHANISMS TO MAINTAIN SEQUENCES OF ITEMS SUCH AS PACKETS

TECHNICAL FIELD

One embodiment of the invention relates to communications and computer systems, especially routers, packet switching systems, and other devices; and more particularly, one embodiment relates to using ordered locking mechanisms to maintain sequences of items which may include converting between ordered locking mechanisms.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

These operations consume time and resources, so one way to speed up their performance is to use multiple processors and to process packets in parallel. However, certain packets belonging to a stream of packets may need to be forwarded from the packet processors or even processed in the order received. Moreover, maintaining the original sequence of packets is in conflict with the desire to retire packets from a processor as soon as they are done in order to clear resources to process more packets. Desired is a way of preserving only the critical order of flows, such as, but not limited to that which does not impose arbitrary and non-optimal order between unrelated packets.

SUMMARY

Disclosed are, inter alia, methods, apparatus, data structures, computer-readable medium, mechanisms, and means for using ordered locking mechanisms to maintain sequences of items which may include converting between ordered locking mechanisms. These items may correspond to anything, including, but not limited to packets, data items, processes, threads, etc.

The number of locks employed by an embodiment may vary and typically is commiserate with the needs of the application. Locks can be used to maintain strong ordering of a stream of items. Additionally, locks can be used to induce ordering of items. For example, a lock can be converted to multiple different locks which allows the same order to be maintained within the different locks, while allowing the items of the different locks to be processed in any order, such as, but not limited to being processed in parallel. Similarly, multiple locks can be converted to a single lock which induces ordering among items previously in the different locks (e.g., typically with the ordering being that in which locking requests are processed).

Additionally, certain embodiments may provide for the locking mechanism to perform atomic operations, which are inherent or explicitly associated with a locking item. Examples of such atomic actions include, but are not limited to conversion of locks, sequence number generation and/or checking, memory operations, data manipulation operations, etc. In one embodiment, a set or command queue of instructions or other indications corresponding to the atomic operations to be performed are associated with a locking item. By allowing the locking mechanism to perform or cause to be performed these operations, the critical latency can typically be reduced as these operations typically can be pipelined and localized, rather than distributed. For example, in one embodiment, such an operation is performed by the locking mechanism or a processing element associated with the locking mechanism, and thus, the delay of the communication between the locking mechanism and the lock requestor before the operation is performed is typically reduced or eliminated.

One embodiment identifies a particular item, and in response, generates a locking request to an ordered lock. The ordered lock is configured to maintain a locking queue of identifiers corresponding to locking requests in the order requested. One or more instructions are associated with the particular identifier, and when the particular identifier reaches the head of the locking queue, the one or more instructions are performed.

One embodiment repeatedly identifies a particular packet, and in response, generates a locking request to an ordered lock, wherein the ordered lock maintains a locking queue of identifiers corresponding the locking requests in the order requested. Acceptances requests corresponding to packets are communicated to the ordered lock. The ordered lock repeatedly removes a particular identifier from the head of the locking queue, and grants a locking acceptance request corresponding to the particular identifier if a corresponding acceptance request was previously generated, or waits until the locking acceptance request corresponding to the particular identifier is generated and then granting the locking acceptance request corresponding to the particular identifier.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
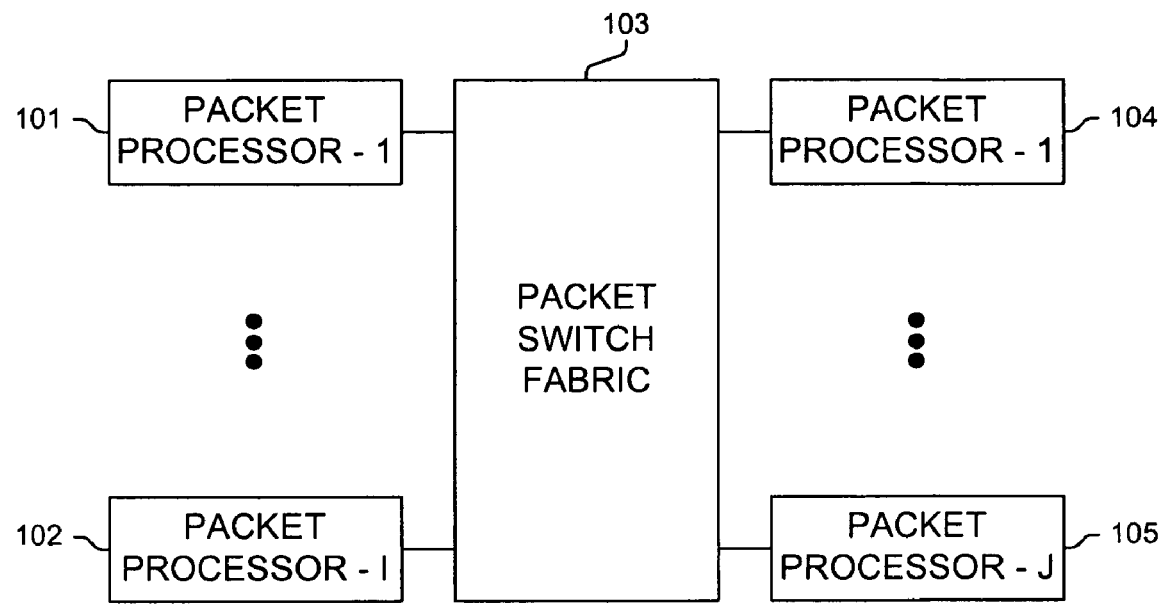
FIG. 1A is a block diagram of an exemplary system employing one embodiment.

Disclosed are, inter alia, methods, apparatus, data structures, computer-readable medium, mechanisms, and means for using ordered locking mechanisms to maintain sequences of items which may include converting between ordered locking mechanisms. These items may be anything, including, but not limited to packets and in which case, using ordered locks to maintain sequences of packets may be of particular use in routers, packet switching systems, and other devices.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

One embodiment identifies a particular item, and in response, generates a locking request to an ordered lock. The ordered lock is configured to maintain a locking queue of identifiers corresponding to locking requests in the order requested. One or more instructions are associated with the particular identifier, and when the particular identifier reaches the head of the locking queue, the one or more instructions are performed.

In one embodiment, the instructions are associated with the particular identifier in an operation performed subsequently to the locking request. In one embodiment, the instructions are associated with the particular identifier in an operation performed after another identifier corresponding to a second locking request is added to the locking queue. In one embodiment, the locking queue contains multiple other identifiers corresponding to other items when the locking request for the particular item is performed. In one embodiment, the one or more instructions include a lock conversion instruction to associate the particular item with a second ordered lock. In one embodiment, the particular item is a packet. In one embodiment, the one or more instructions include a packet gather instruction. In one embodiment, one or more fields of the particular packet are processed to identify a secondary ordered lock, and the one or more instructions include a lock conversion instruction to associate the particular item with a second ordered lock.

One embodiment repeatedly identifies a particular packet, and in response, generates a locking request to an ordered lock, wherein the ordered lock maintains a locking queue of identifiers corresponding the locking requests in the order requested. Acceptances requests corresponding to packets are communicated to the ordered lock. The ordered lock repeatedly removes a particular identifier from the head of the locking queue, and grants a locking acceptance request corresponding to the particular identifier if a corresponding acceptance request was previously generated, or waits until the locking acceptance request corresponding to the particular identifier is generated and then granting the locking acceptance request corresponding to the particular identifier.

In one embodiment, the locking requests are non-blocking and acceptance requests are blocking. In one embodiment, in response to granting the locking acceptance request corresponding to a packet, the packet is forwarded. In one embodiment, in response to granting the locking acceptance request corresponding to a packet, a second locking request corresponding to the packet to a particular secondary lock is made, with the particular secondary lock being identified based on contents of the packet.

One embodiment includes multiple packet processors, an ordered lock manager, and a distributor. The ordered lock manager is configured to receive lock requests, to receive instruction requests corresponding to the lock requests, and to process instructions corresponding to the lock requests in the order the lock requests are received and after an immediately prior lock request is released. The distributor is configured to receive a packet, make a locking request corresponding to the packet to the ordered lock manager, and to distribute the packet to one or more processors. At least one of the one or more processors is configured to communicate a set of instructions corresponding to the packet to the ordered lock manager.

In one embodiment, the set of instructions includes a packet gather instruction. In one embodiment, the set of instructions includes an instruction for performing a lock release. In one embodiment, the set of instructions includes a convert instruction for performing a secondary locking request.

One embodiment includes one or more locking mechanisms, multiple packet processors, and a packet distributor. The one or more locking mechanisms operates multiple ordered locks, including a root ordered lock and multiple secondary ordered locks. Each ordered lock including a queue for storing locking items. Each locking mechanism is configured to receive locking requests and to place indications of the locking requests in corresponding queues of the ordered locks, and to receive and react to locking accepts and locking releases. The packet distributor is configured to receive packets, to make root ordered locking requests for each of the packets, and to distribute each of the packets to the packet processors. Each packet processor is configured to receive a particular packet, to accept a root ordered lock corresponding to the root ordered locking request for the particular packet, to process the packet to identify a secondary lock, to make a locking request corresponding to the secondary lock, and to release the root ordered lock. In one embodiment, each packet processor is configured to make the lock request corresponding to the secondary lock after accepting the root ordered lock corresponding to the root ordered locking request for the particular packet and before releasing the root ordered lock.

FIG. 1A is a block diagram of an exemplary system employing one embodiment. Shown is a packet switching system with packet processors 101-102 and 104-105 interconnected by packet switch fabric 103. In one embodiment, one or more of the packet processors 101-102 and 104-105 uses ordered locking mechanisms to maintain required sequences of packets.

Figure 1B:
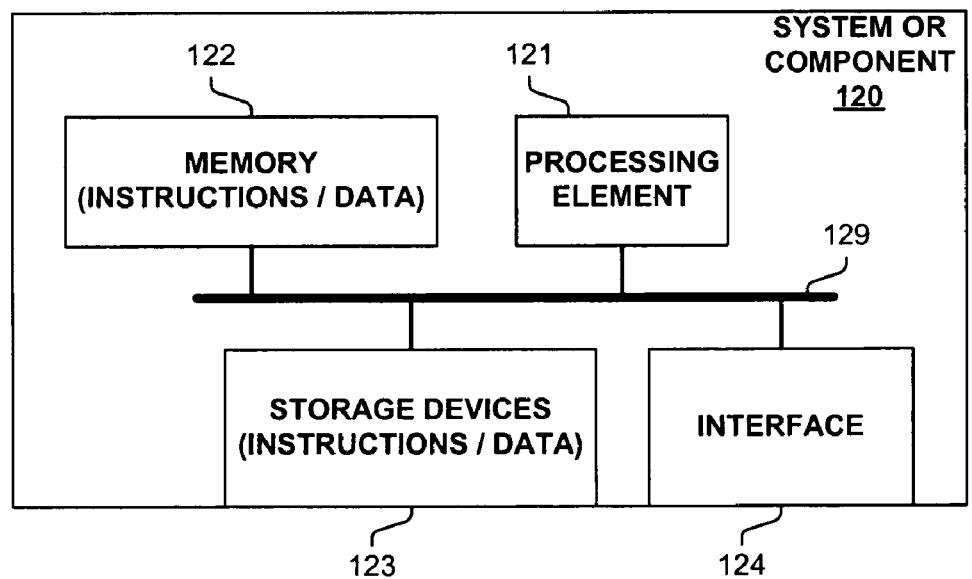
FIG. 1B is a block diagram of a system or component thereof, such as, but not limited to a packet processor, lock mechanism, lock manager, distributor, gatherer, or resource used in one embodiment.

FIG. 1B is a block diagram of a system or component 120 thereof, such as, but not limited to a packet processor, lock mechanism, lock manager, distributor, gatherer, or resource used in one embodiment. In one embodiment, system or component 120 performs one or more processes corresponding to one of the flow diagrams illustrated or otherwise described herein.

In one embodiment, component 120 includes a processing element 121, memory 122, storage devices 123, and an interface 124 for receiving and sending packets, items, and/or other information, which are typically coupled via one or more communications mechanisms 129 (shown as a bus for illustrative purposes.) Various embodiments of component 120 may include more or less elements. The operation of component 120 is typically controlled by processing element 121 using memory 122 and storage devices 123 to perform one or more scheduling tasks or processes. Memory 122 is one type of computer-readable medium, and typically comprises random access memory (RAM), read only memory (ROM), flash memory, integrated circuits, and/or other memory components. Memory 122 typically stores computer-executable instructions to be executed by processing element 121 and/or data which is manipulated by processing element 121 for implementing functionality in accordance with the invention. Storage devices 123 are another type of computer-readable medium, and typically comprise solid state storage media, disk drives, diskettes, networked services, tape drives, and other storage devices. Storage devices 123 typically store computer-executable instructions to be executed by processing element 121 and/or data which is manipulated by processing element 121 for implementing functionality in accordance with the invention.

Sequences of items may be maintained using ordered locks. These items may correspond to anything, but using ordered locks to maintain sequences of packets may be particularly useful. One embodiment uses a locking request, acceptance, and release protocol. One embodiment associates instructions with locking requests such that when a lock is acquired, the locking mechanism executes or causes to be executed the associated instructions as an acceptance request of the lock is implied by the association of instructions (or may be explicitly requested). In some applications, the ordering of the entire sequence of packets is not required to be preserved, but rather only among certain sub-sequences of the entire sequence of items, which can be accomplished by converting an initial root ordered lock (maintaining the sequence of the entire stream of items) to various other locks (each maintaining a sequence of different sub-streams of items).

One embodiment of a locking mechanism uses the following basic and extensible operations:

request(lock_id)—The context requests a lock. A "context" typically refers to state and resources including processor engine, thread, etc. associated with a packet or other entity while it is being processed. If the requested lock is available (i.e., no other context owns it) then a lock_grant is sent to the requesting context. If however the lock is in possession of another context, then the new request is queued until it moves to the front of the queue and the lock_grant is sent. It is a non-blocking operation, i.e., any code after the request but before the accept is not part of the critical section, and can be executed before the lock_grant is received.

accept(lock_id)—This is a blocking operation, which causes the requesting context to block until it holds the desired lock (i.e., lock_grant has been received). Any code executed after the accept, but before the release is the critical section for this lock.

release(lock_id)—This is the operation which releases the lock, and makes it available for other requesting contexts.

Figure 2A:
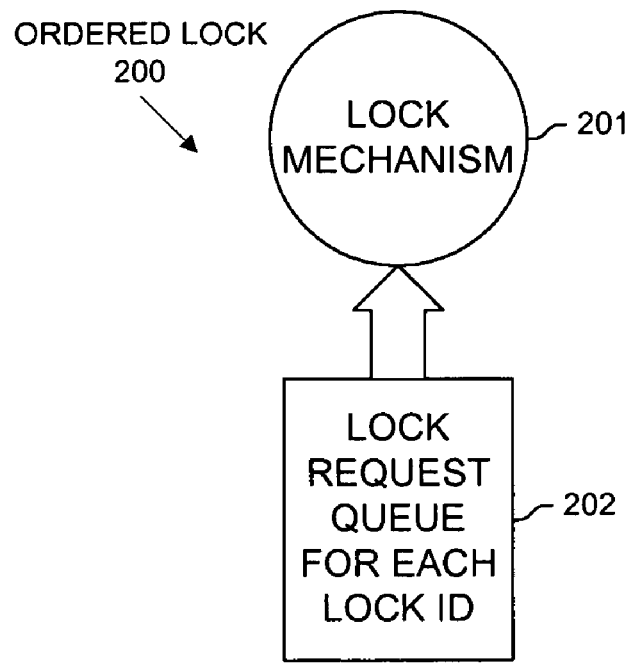
FIGS. 2A-2C illustrate an ordered lock used in one embodiment.
Figure 2B:
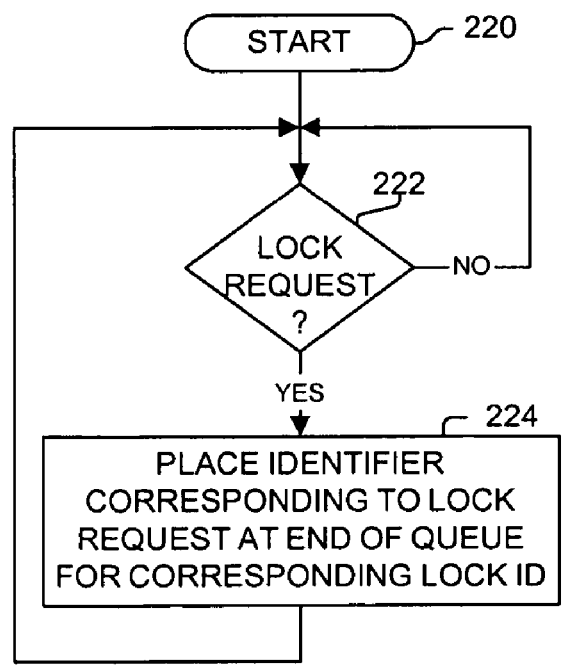
Figure 2C:
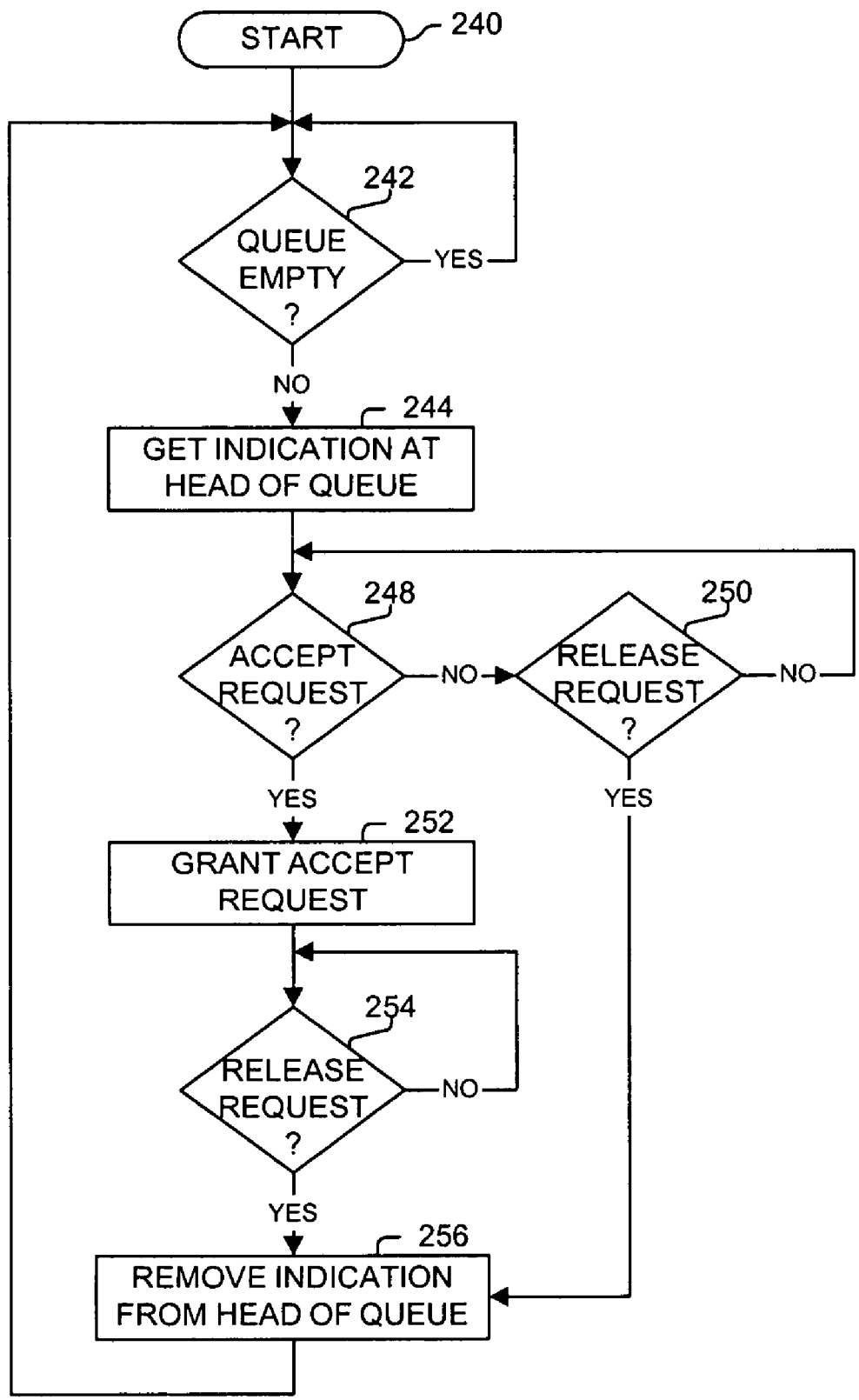

FIGS. 2A-2C illustrate an ordered lock 200 used in one embodiment. Turning to FIG. 2A, lock mechanism 201 performs the locking operations, and can be implemented in an unlimited number of ways, including, but not limited to a processing element and memory, discrete logic, a custom ASIC etc. In one embodiment, ordered lock 200 uses one or more locking queues 202 (or any other mechanism to maintain the order requests are received), typically one for each lock supported. In one embodiment, ordered lock 200 only services a single lock, and thus no lock ID is required to identify a particular lock (e.g., a root lock, a secondary lock, etc.) In one embodiment, ordered lock 200 services multiple locks, with the particular ordered lock typically being identified by a lock ID (e.g., a unique value, etc.) or via another mechanism. Lock request queues 202 can be implemented in an unlimited number of ways, such as in different memories, shift registers, a single memory with each queue element identified using a link list or other data structure, etc.

FIG. 2B illustrates a lock mechanism process used in one embodiment for processing lock requests. Processing begins with process block 220. As determined in process block 222, when a lock request is received or otherwise identified, then in process block 224, an identifier corresponding to the identified lock request is placed at the end of the lock request queue corresponding to the request (e.g., that identified by a lock ID or other mechanism if more than one lock being supported by the locking mechanism). Processing then returns to process block 222. In this manner, the order that locking requests are received is maintained by the locking mechanism.

FIG. 2C illustrates a process used in one embodiment to process lock items/requests for each queue supported by the locking mechanism. Processing begins at process block 240. As determined in process block 242, when there is a lock identifier in the queue, then in process block 244, the indication corresponding to a lock request at the head of the queue is identified. As determined in process block 248, if an accept request corresponding to the identifier has been received, then in process block 252, the accept request is granted. Processing then waits at process block 254 until a corresponding release request is received, and then the indication is removed from the head of the queue in process block 256, and processing returns to process block 242. Otherwise, as determined in process block 250, if a release request corresponding to the identification is received, processing proceeds directly to process block 256. Otherwise, processing returns to process block 248.

One embodiment of a locking mechanism uses the following basic and extensible operations:

request(lock_id)—The context requests a lock. If the requested lock is available (i.e., no other context owns it) then a lock_grant is sent to the requesting context. If however the lock is in possession of another context, then the new request is queued until it moves to the front of the queue and the lock_grant is sent. It is a non-blocking operation, i.e., any code after the request but before the accept is not part of the critical section, and can be executed before the lock_grant is received.

attach(operation+attributes, convert+dest_flow_id)—The attach actually consists of an implied accept (i.e., get to the front of the queue for the current flow_id), followed by do_action and/or convert to a new flow_id and finally release current lock. Embodiments may use different attach operations.

Figure 3A:
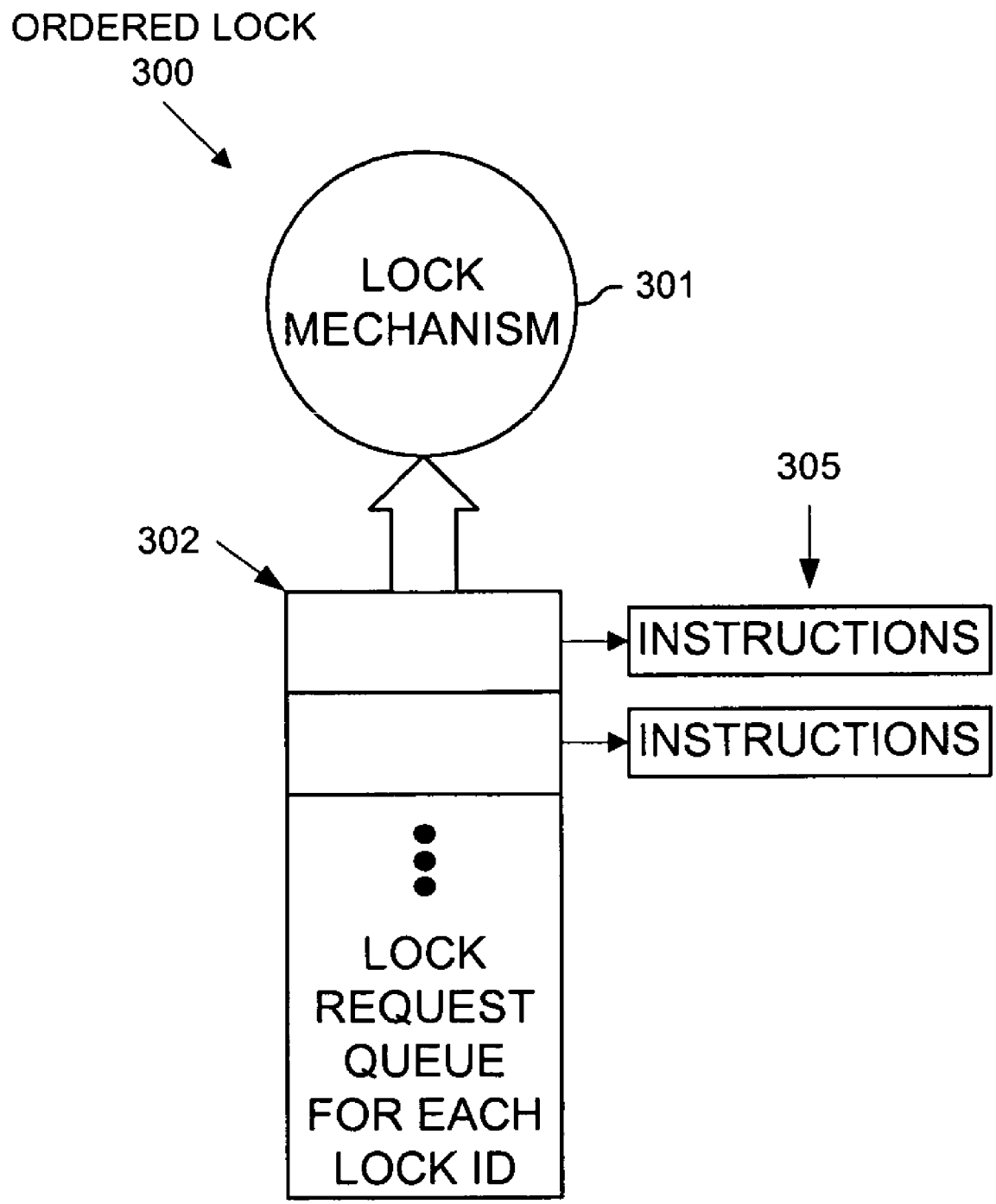
FIGS. 3A-3D illustrate an ordered lock used in one embodiment.

FIGS. 3A-3D illustrate an ordered lock 300 used in one embodiment. Turning to FIG. 3A, lock mechanism 301 performs the locking operations, and can be implemented in an unlimited number of ways, including, but not limited to a processing element and memory, discrete logic, a custom ASIC etc. In one embodiment, ordered lock 300 uses one or more locking queues 302 (or any other mechanism to maintain the order requests are received), typically one for each lock supported. In one embodiment, ordered lock 300 only services a single lock, and thus no lock ID is required to identify a particular lock (e.g., a root lock, a secondary lock, etc.) In one embodiment, ordered lock 300 services multiple locks, with the particular ordered lock typically being identified by a lock ID (e.g., a unique value, etc.) or via another mechanism. Lock request queues 302 can be implemented in an unlimited number of ways, such as different memories, shift registers, a single memory with each queue element identified using a link list or other data structure, etc. As illustrated, instructions 305 are associated with received lock requests, such as those identified by lock identifiers stored in lock request queue(s) 302. These instructions can be associated with the lock requests using an unlimited number of techniques, and these instructions can be stored in queue 302 or in one or more other data structures.

Figure 3B:
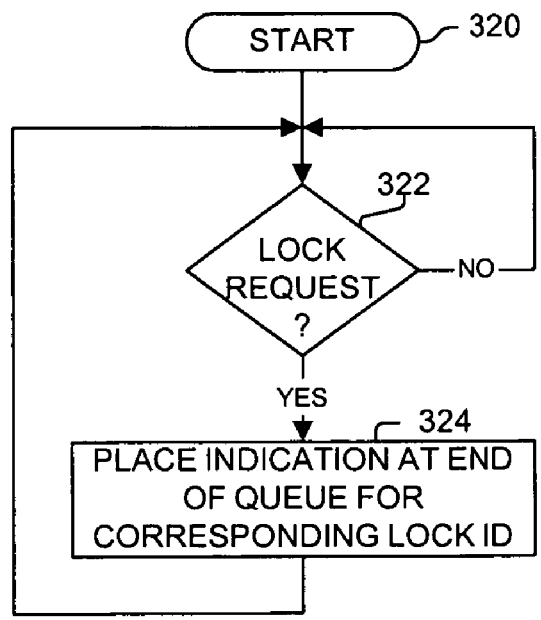

FIG. 3B illustrates a lock mechanism process used in one embodiment for processing lock requests. Processing begins with process block 320. As determined in process block 322, when a lock request is received or otherwise identified, then in process block 324, an identifier corresponding to the identified lock request is placed at the end of the lock request queue corresponding to the request (e.g., that identified by a lock ID or other mechanism if more than one lock being supported by the locking mechanism). Processing then returns to process block 322. In this manner, the order that locking requests are received is maintained by the locking mechanism.

Figure 3C:
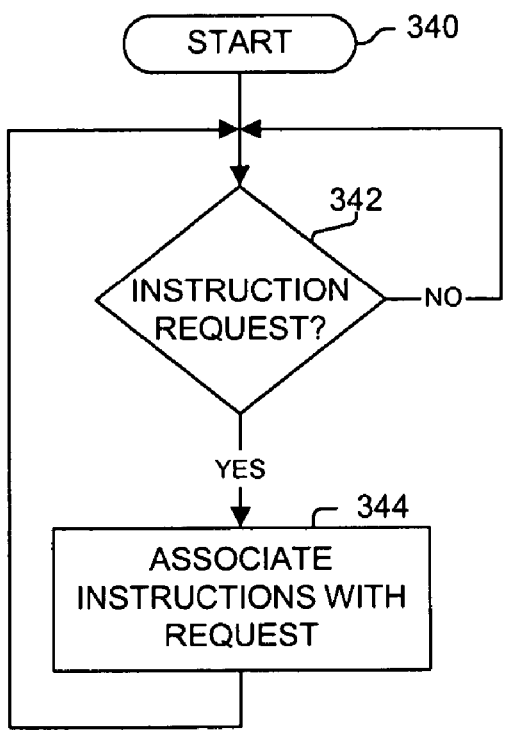

FIG. 3C illustrates a process used in one embodiment to process instruction requests by a locking mechanism. Processing begins with process block 340. As determined in process block 342, when an instruction request is identified (e.g., received, etc.), then in process block 344, these instructions are associated with the lock request (e.g., a lock identifier in a locking mechanism, or via any other mechanism).

Figure 3D:
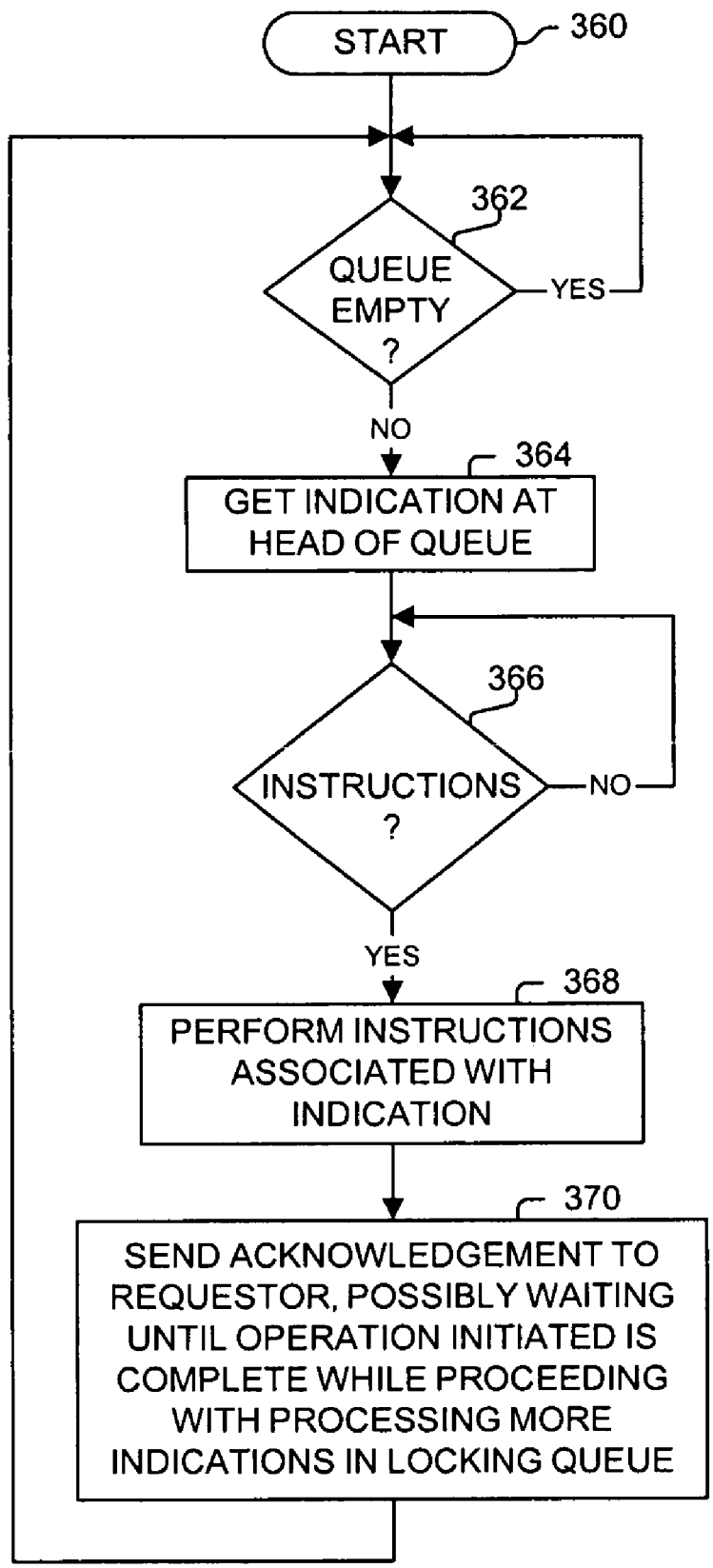

FIG. 3D illustrates a process used in one embodiment to process lock items/requests for each queue supported by the locking mechanism. Processing begins at process block 360. As determined in process block 362, when there is a lock identifier in the queue, then in process block 364, the indication corresponding to a lock request at the head of the queue is identified. Until instructions corresponding to the identifier have been identified (e.g., received or otherwise identified now or previously), processing remains at 366. After corresponding instructions have been identified, in process block 368, the instructions are performed by the locking mechanism and/or another processing mechanism.

These instructions may be blocking (e.g., the lock must complete before proceeding to a next instruction or other operation) or non-blocking (e.g., initiate an operation and proceed with other instructions or operations). In one embodiment, the performed instruction(s) may include initiating an operation and block until the operation is complete. In one embodiment, the performed instruction(s) may include initiating an operation and do not block until the operation is complete. In one embodiment, the performed instruction(s) may include initiating an operation and delay sending an acknowledgement indication to the lock requestor until the operation is complete while proceeding with other lock items in the queue. For example, an operation to gather parts of a packet from different memory locations and/or memories might be initiated, while the acknowledgement operation might be delayed until the memory access or accesses have been completed so that the memory location(s) can be overwritten.

In process block 370, an acknowledgement message is sent to the requester, with this acknowledgment message being sent immediately or delayed until some other operation is complete, and possibly proceeding with processing more locking items in the queue before such acknowledgement is sent. Processing returns to process block 362. From one perspective, the receipt of instructions acts as an implied lock acceptance request, or even in one embodiment, the acceptance is one of the instructions associated with a lock request or indication thereof.

FIGS. 4A-D illustrate the concept of a lock conversion used in one embodiment. Note, the number and type of lock conversions used is extensible and may vary among embodiments to match the requirements of the application. Locks can be used to maintain strong ordering of a stream of items. Additionally, locks can be used to induce ordering of items. For example, a lock can be converted to multiple different locks which allows the same order to be maintained within the different locks, while allowing the items of the different locks to be processed in any order, such as, but not limited to being processed in parallel. Similarly, multiple locks can be converted to a single lock which induces ordering among items previously in the different locks (e.g., typically with the ordering being that in which locking requests are processed).

For example, packets arriving on an interface might each make a locking request in the order they are received to a single root lock, or make a locking request to one of multiple root locks (e.g., one for each receiving port, protocol type, packet type, etc., or some combination thereof). This maintains the order of the packets as the locks are processed in the order that the requests were made (e.g., the arrival order of packets in one embodiment). These locks can then be converted to different locks based on the processing of the packet required or some value included in the packet or other data structure, etc. For example, certain packet streams must maintain ordering. By converting all locks corresponding to the packets of the stream from a root lock to a same other lock, this ordering is maintained. Similarly, this second lock (or nth lock where n is any integer for that matter—as the number of possible locking conversions is unbounded) may be converted to another lock such as one corresponding to an output interface or port, and thus the original ordering can be maintained (even if lock conversions from other locks are made to the same lock as the relative order within each stream is maintained by the lock).

Figure 4A:
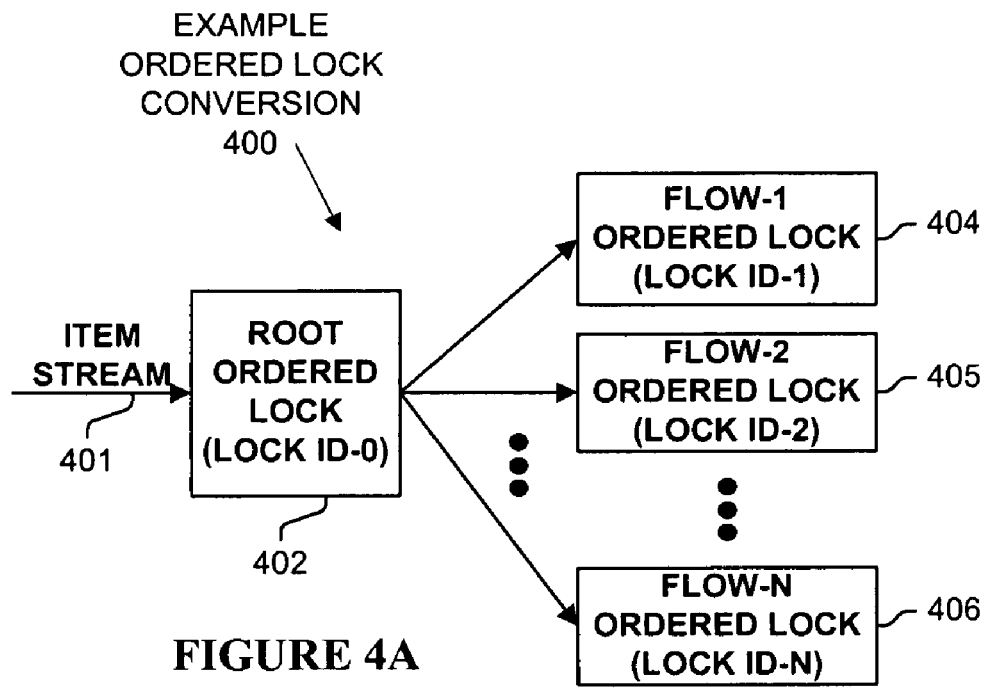
FIGS. 4A-D illustrate the concept of a lock conversion used in one embodiment.

Turning first to FIG. 4A, illustrated is an example of an ordered lock conversion 400. A stream of items 401 is processed by a ordered lock 402 (identified for simplicity as the "root lock"). When the root lock 402 is acquired by a particular identifier/item, if it is associated with a flow (also referred to as a sub-sequence or sub-stream) within stream 401, the ordered lock 404-406 corresponding to this flow is identified and a locking request is made to this secondary ordered lock

404-406. Note, ordered locks 402-406 can be implemented using one or more ordered lock mechanisms, with each lock implicitly identified or explicitly identified using a lock ID or other mechanism. Thus, the relevant ordering within the initial stream as maintained by root ordered lock 402 is transferred to each of the flow ordered locks 404-406, and the lock associated with an item is "converted" from root ordered lock 402 to one or more of the flow ordered locks 404-406.

Figure 4B:
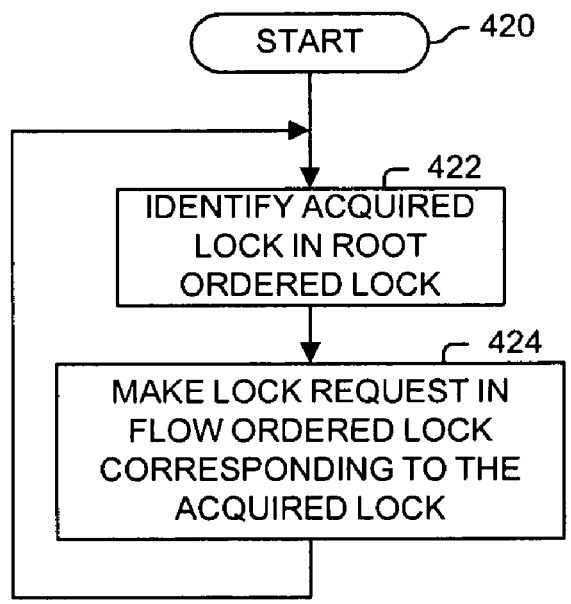

FIG. 4B illustrates such processing used by a locking mechanism in one embodiment. Processing begins with process block 420, and proceeds to process block 422, wherein the acquired lock (e.g., indication explicitly or implicitly accepted at the front of the corresponding queue or other ordering mechanism) in the root lock is identified. Note, processing may need to wait until a lock is acquired. Next, in process block 424, a lock request is made in the flow ordered lock corresponding to the acquired lock. Processing then returns to process block 422.

Figure 4C:
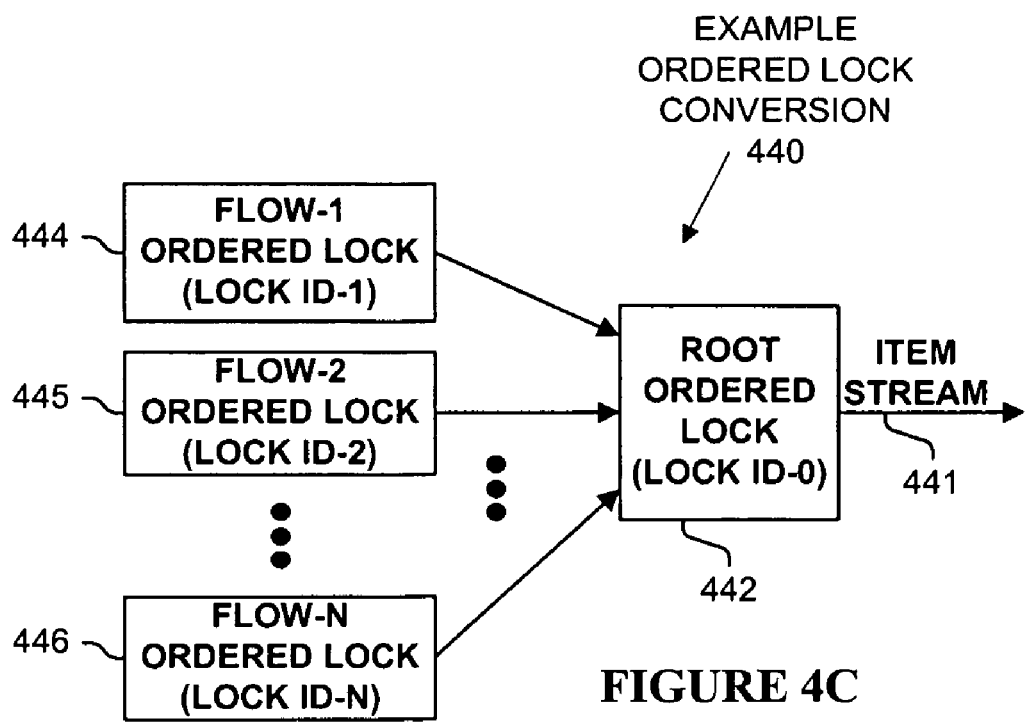

Similarly, conversion of locks 440 can be made from multiple flow locks 444-446 to another ordered lock 442 (identified for simplicity as the "root lock") as illustrated in FIG. 4C to produce a stream of items 441. When one of the multiple flow locks 444-446 is acquired by a particular identifier/item and a conversion operation is desired to root lock 442, a locking request is made to this secondary lock 442. Note, ordered locks 442-446 can be implemented using one or more ordered lock mechanisms, with each lock implicitly identified or explicitly identified using a lock ID or other mechanism.

Figure 4D:
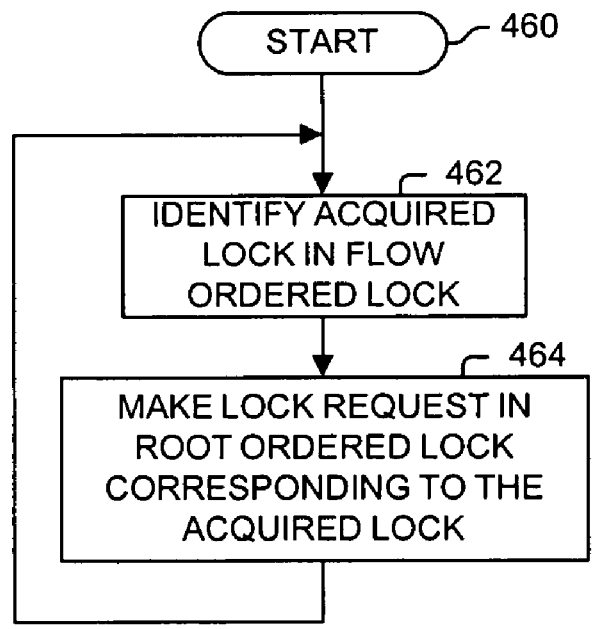

FIG. 4D illustrates such processing used by locking mechanisms in one embodiment. Processing begins with process block 460, and proceeds to process block 462, wherein the acquired lock (e.g., indication explicitly or implicitly accepted at the front of the corresponding queue or other ordering mechanism) in an ordered lock is identified. Note, processing may need to wait until a lock is acquired. Next, in process block 464, a lock request is made in an ordered lock. Processing then returns to process block 462. Thus, when this process is performed in connection by multiple flow ordered locks to a single root flow ordered lock, the original order of the items corresponding to the multiple flow ordered locks is maintained.

Figure 5A:
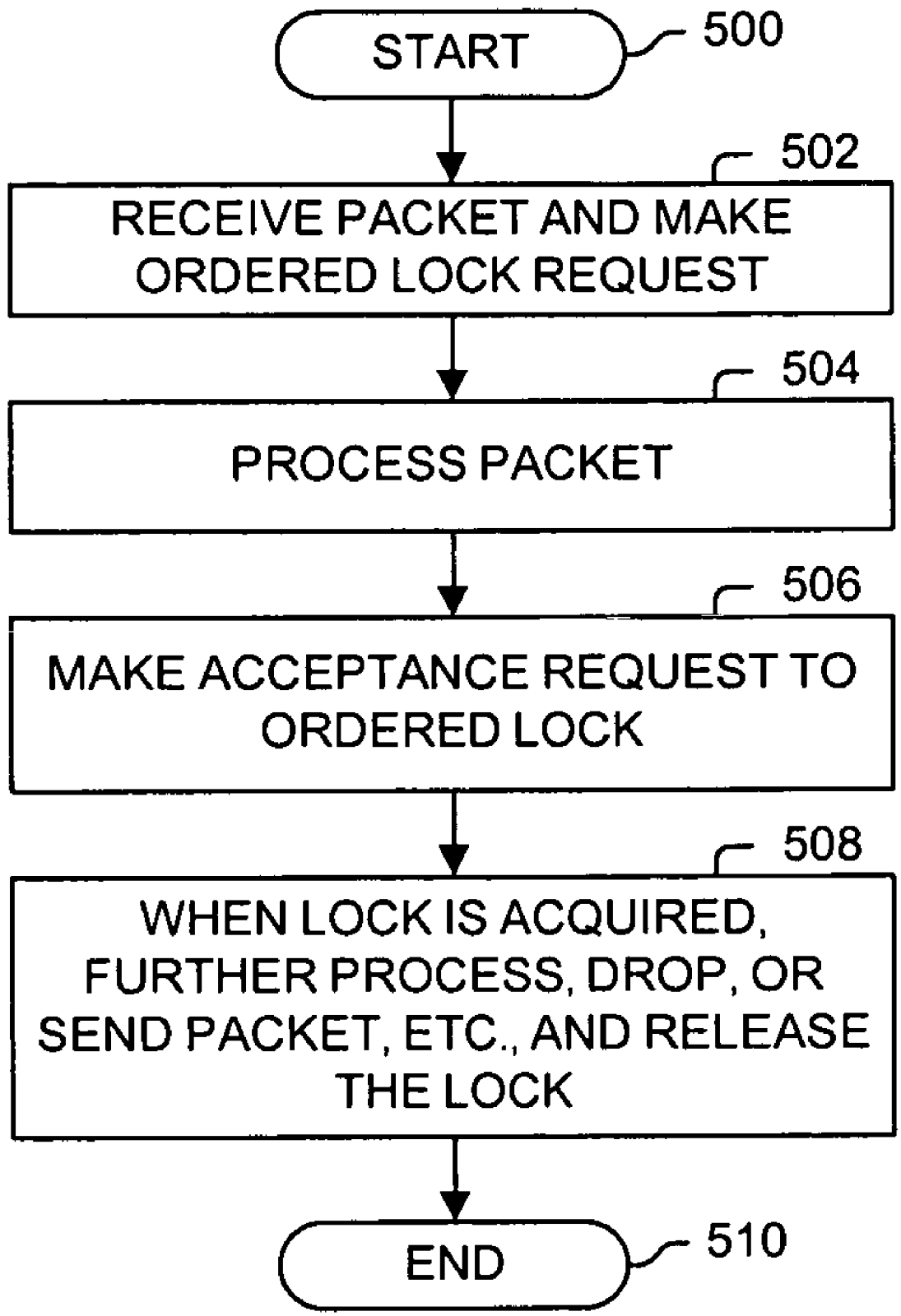
FIGS. 5A-D are a flow diagrams illustrating some of an unlimited number of embodiments for using ordered locks to maintain sequences of packets.

FIGS. 5A-D are a flow diagrams illustrating some of an unlimited number of embodiments for using ordered locks to maintain sequences of packets. Turning first to FIG. 5A, processing begins with process block 500, and proceeds to process block 502, wherein a packet is received and a corresponding ordered lock request is made. Next, in process block 504, the packet is processed. In process block 506, an acceptance request is made to the ordered lock. In process block 508, when the lock is acquired, the packet is further processed, dropped, sent etc., and the lock is released. By waiting until the lock is acquired, the original ordering is maintained. Processing of the flow diagram is complete as indicated by process block 510.

Figure 5B:
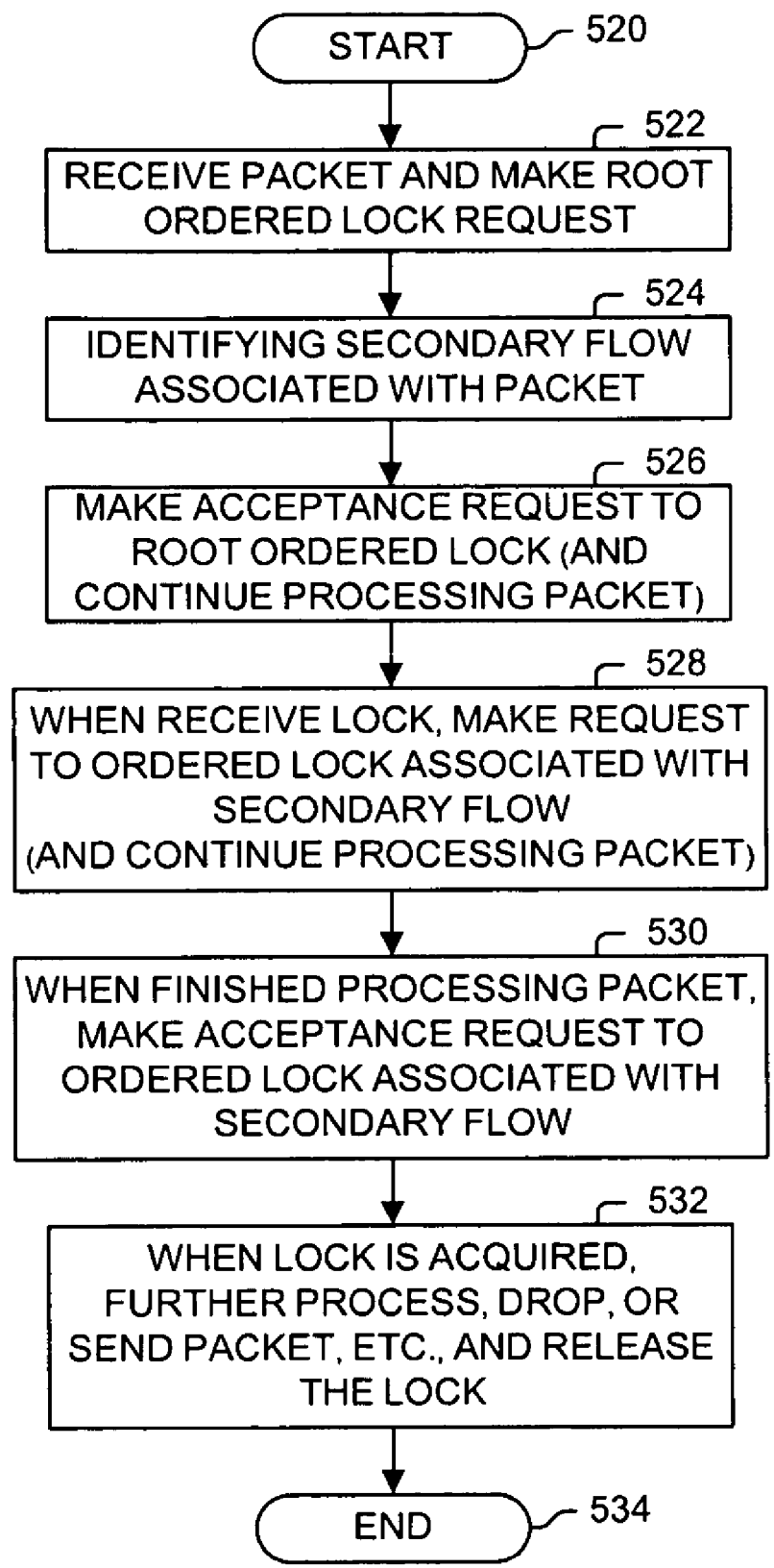

FIG. 5B illustrates a process used in one embodiment for processing packets using ordered locking mechanisms. Processing begins with process block 520, and proceeds to process block 522, wherein a packet is received and a corresponding ordered lock request is made. Next, in process block 524, a secondary flow associated with a packet is identified. For example, an original stream of packets may be all packets received on an interface, and a particular flow might be identified based on a source address, destination address, protocol type, quality of service requirement, group identification, and/or any other information contained in a packet or external to a packet. In one embodiment, all items belong to a secondary flow, which may include a default flow for packets not associated with another particular flow. In one embodiment, only some of the items belong to a secondary flow, and typically those packets not belonging to a secondary flow are allowed to proceed as processed.

In process block 526, an acceptance request to the root ordered lock, and typically the processing of the packet continues. In process block 528, when the lock is acquired, a lock request is made to the secondary ordered lock corresponding to the identified secondary flow. In process block 530, when processing of the packet is finished, an acceptance request is made to the corresponding secondary ordered lock, and in process block 532, when the secondary ordered lock is acquired, the packet is further processed, dropped, sent etc., and the lock is released. Processing of the flow diagram is complete as indicated by process block 534.

Figure 5C:
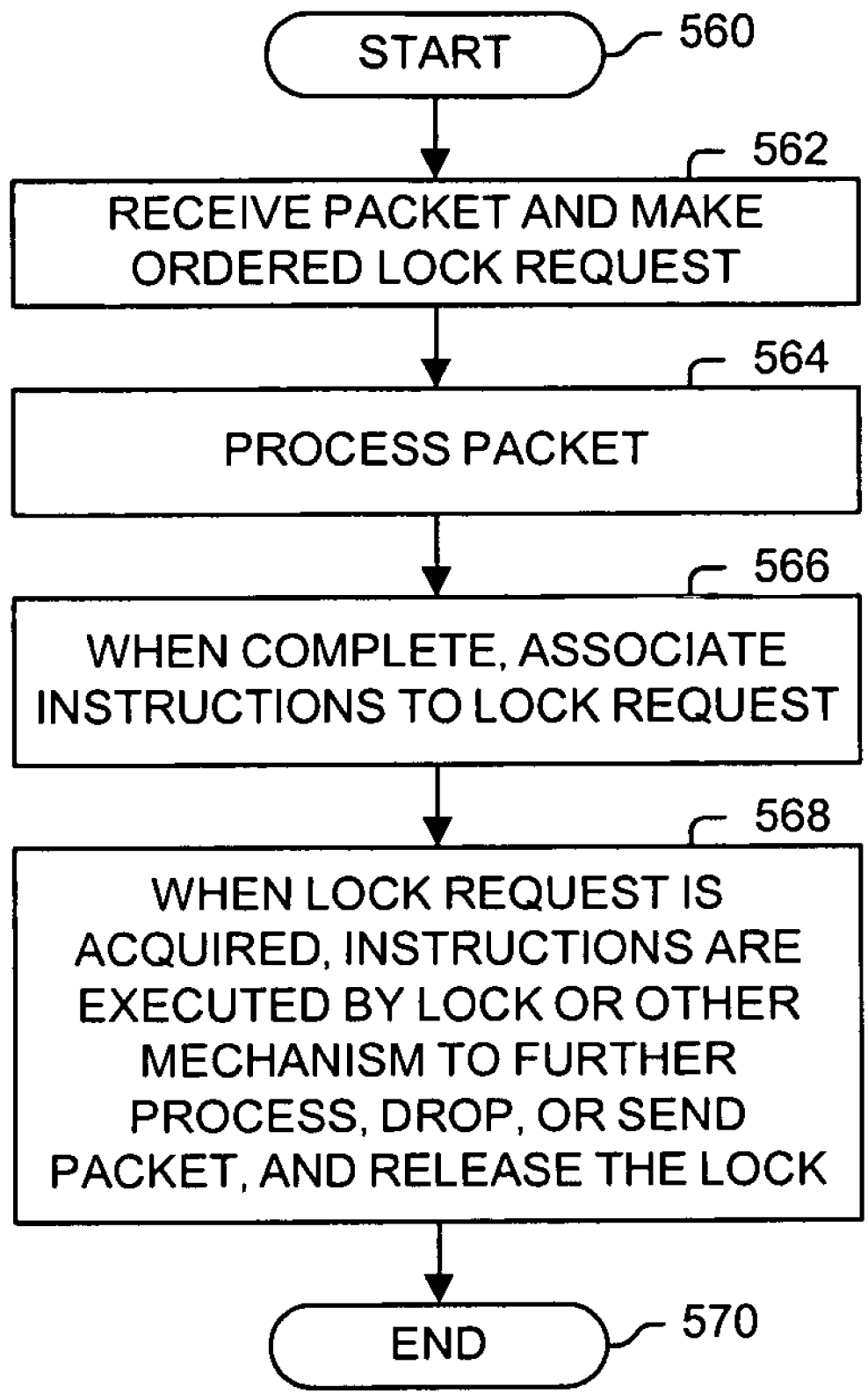

Processing of the flow diagram of FIG. 5C begins with process block 560, and proceeds to process block 562, wherein a packet is received and a corresponding ordered lock request is made. Next, in process block 564, the packet is processed. In process block 566, when processing of the packet is complete, a set of one or more instructions is associated with the lock request. Note, the atomic operations to be performed in response to the instructions is extensible, and is typically defined in accordance with the needs of the application. For example, these atomic operations may include an operation including, but not limited to conversion of locks, sequence number generation and/or checking, error checking and/or correcting, memory operations, data manipulation operations, initiating another operation, etc. In process block 568, when the lock is acquired, the instructions are executed by the lock mechanism or another mechanism, typically to further process, drop or gather/send packet, convert the root lock request, etc., and the lock is released. By waiting until the lock is acquired before executing the instructions, the original ordering is maintained. Processing of the flow diagram is complete as indicated by process block 570.

Figure 5D:
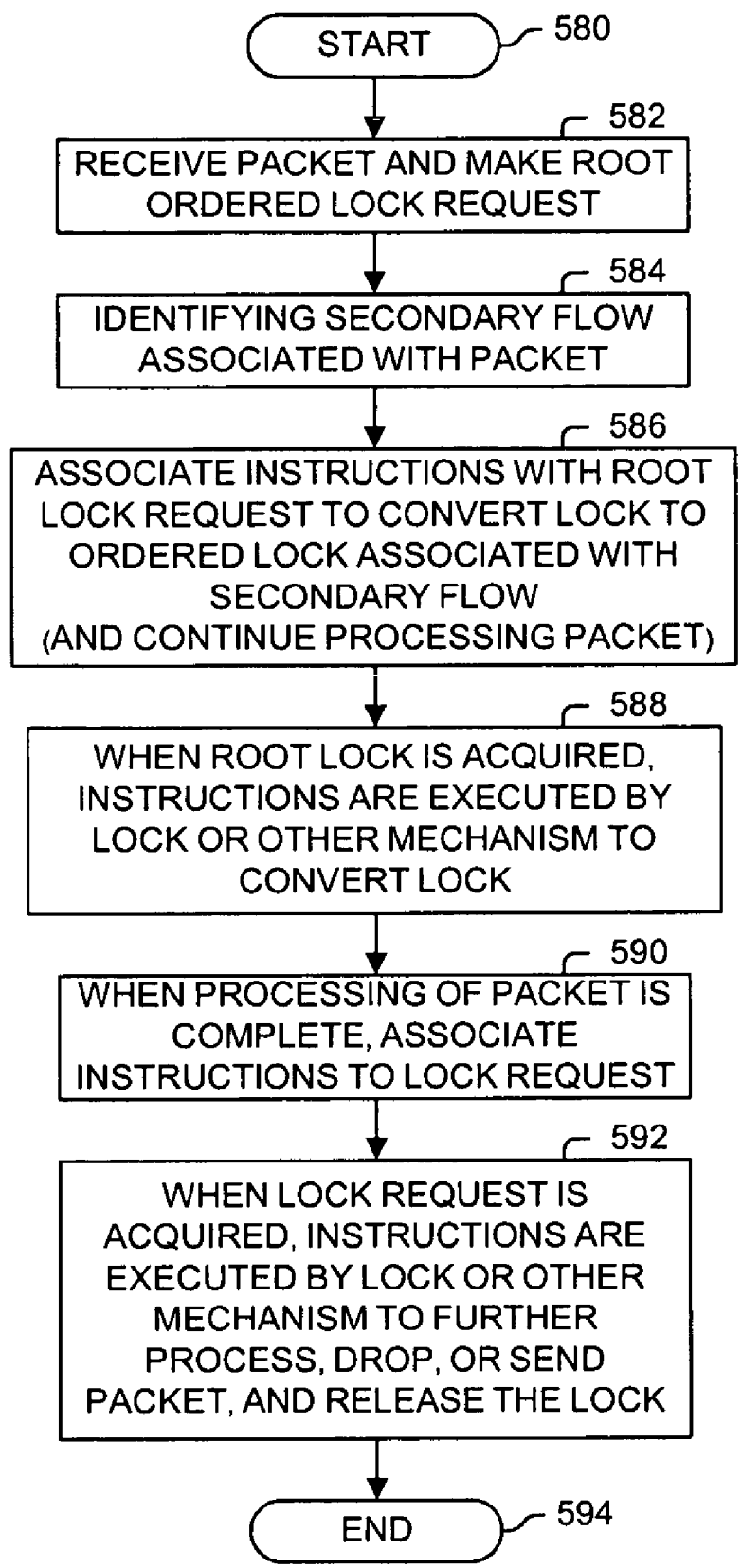

FIG. 5D illustrates a process used in one embodiment for processing packets using ordered locking mechanisms. Processing begins with process block 580, and proceeds to process block 582, wherein a packet is received and a corresponding root ordered lock request is made. Next, in process block 584, a secondary flow associated with a packet is identified. In process block 586, when processing of the packet is complete, a set of one or more instructions is associated with the lock request, with these instructions including a convert operation instruction. In process block 588, when the lock is acquired, the instructions are executed by the lock mechanism or another mechanism, to convert the root lock to the identified secondary lock. In process block 590, when processing of the packet is complete, a set of one or more instructions is associated with the secondary lock request. In process block 592, when the lock is acquired, the instructions are executed by the lock mechanism or another mechanism, typically to further process, drop or gather/send packet, convert the root lock request, etc., and the lock is released. Processing of the flow diagram is complete as indicated by process block 594.

Figure 6A:
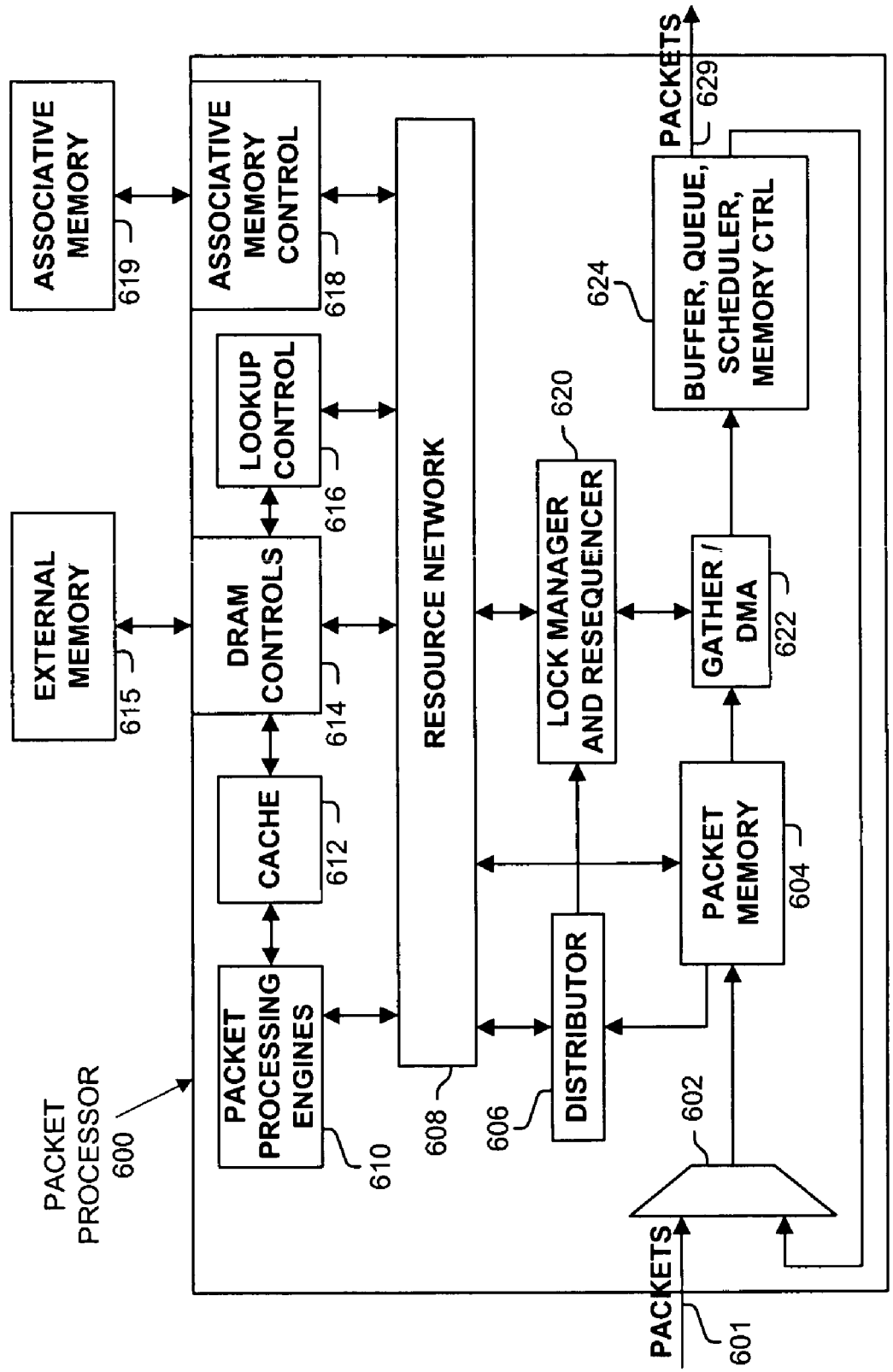
FIG. 6A is a block diagram of an exemplary system using ordered locks to maintain sequences of packets.

FIG. 6A is a block diagram of an exemplary system using ordered locks to maintain sequences of packets. Packets 601 are received by packet processor 600 and typically stored in packet memory 604 via multiplexor 602 (as packet processor allows for recirculation of packets from component 624). Distributor 606 is responsible for assigning a packet to one or more of the packet processing engines 610 for performing the actual packet processing. This processing may use cache 612, DRAM controls 614 and external memory 615, lookup control 616, associative memory control 618 and associative memory 619, and/or other components which are typically accessed via coupled resource network 608. Distributor 606 also notifies lock manager and resequencer 620 of the assignment of the packet, and a root lock request is made. Packet processing engines 610 perform lock requests, acceptances, releases, attaching/associating instructions with lock requests in conjunction with lock manager and resequencer 620. At the appropriate time, gather mechanism 622 is notified that a packet should be gathered and sent, for example based on a gather instruction associated with a lock request. A gather instruction typically defines how to accumulate or gather portions of a processed packet in order to form the processed packet, and may included the semantics to send the packet. Gathered packets are communicated to buffer, queue, scheduler, memory control component 624 to send the processed packet as indicated by packets 629.

Figure 6B:
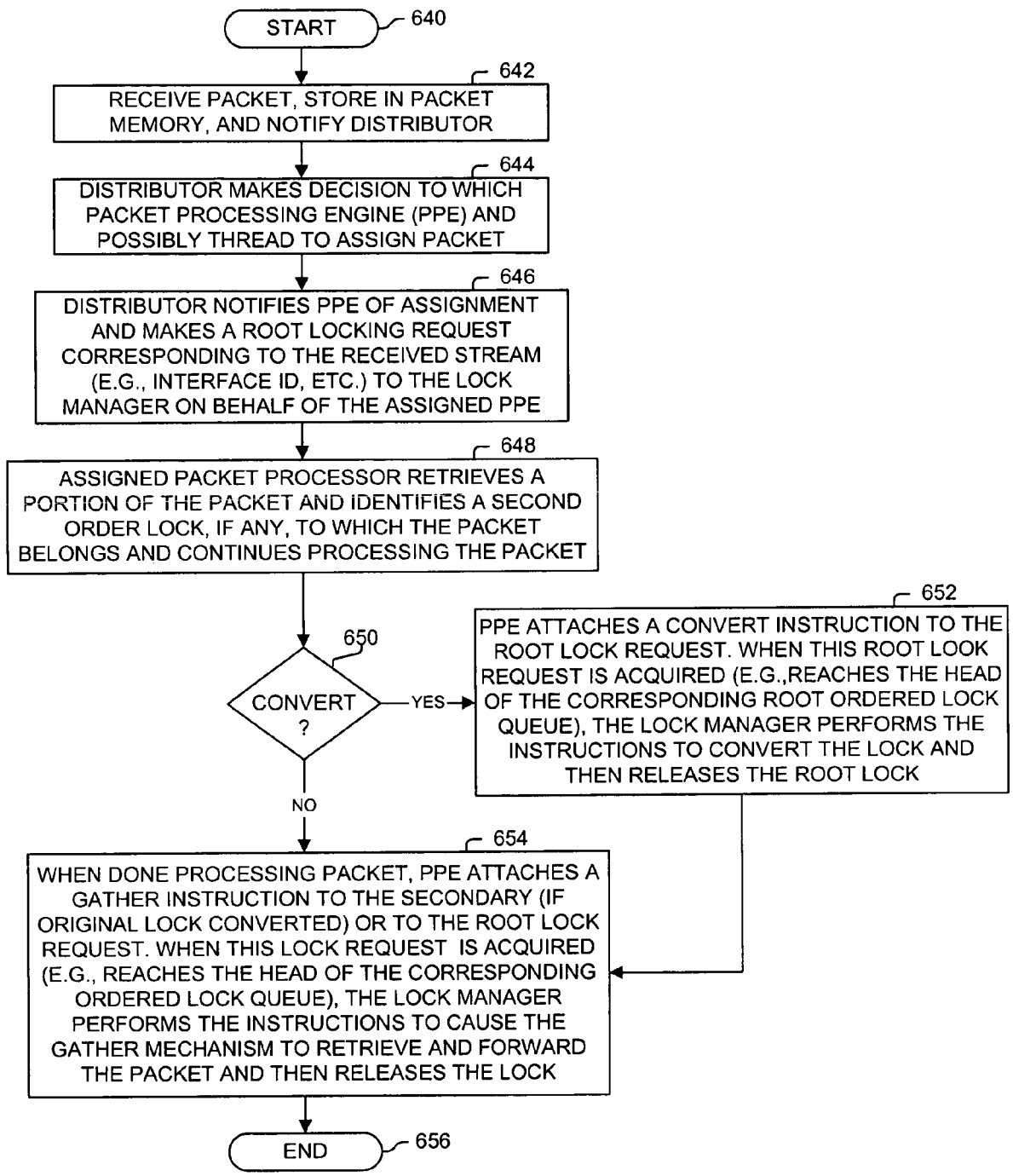
FIG. 6B is a flow diagram illustrating a process using ordered locks processing using ordered locks to maintain sequences of packets.

The operation of one embodiment of packet processor 600 and/or other packet processors is described in relation to FIG. 6B. Processing of which begins with process block 640, and proceeds to process block 642, wherein a packet is received and stored in packet memory, and the distributor is informed of the arrival and location of the packet. In process block 644, the distributor identifies to which packet processing engine and possibly thread to assign to process the packet. In process block 646, the distributor notifies the packet processing engine of the assignment and makes a root locking request corresponding to the received stream to which the packet belongs, such as the interface on which it was received. In one embodiment, the stream is identified based on the packet contents, but other embodiments minimize the processing of the packet performed by the distributor. The distributor also makes a locking request on behalf of the assigned packet processing engine to the lock manager for the packet. In process block 648, the assigned packet processing engine retrieves the relevant portion (e.g., header and possibly other fields) of the packet from the packet memory, and processes this and/or other information to identify a secondary flow/lock, if any, to which the packet is associated and continues processing the packet.

As determined in process block 650, if a convert operation is to be performed, then in process block 652, the packet processing engine associates/attaches a convert instruction to the root lock request, and when the root lock is acquired, such as the corresponding identifier reaches the front of the root lock queue, the lock manager performs (or causes another mechanism to perform) instructions to convert the lock and then releases the root lock.

Next, in process block 654, when processing of the packet is complete, the packet processing engine attaches a gather instruction to the secondary or root lock request (depending on whether an ordered lock conversion operation was performed). When this lock is acquired, the lock manager performs (or causes another mechanism to perform) instructions to gather the fields of the packet to form the packet to be sent, and forwards the packet. Processing of the flow diagram is complete as indicated by process block 656.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for maintaining ordering, the method comprising:
    employing a particular machine to perform the following steps:
    identifying a particular item of a plurality of items and in response, generating a locking request to an ordered lock corresponding to the particular item, wherein the ordered lock is configured to maintain a locking queue of identifiers corresponding to locking requests in the order requested and to place a particular identifier corresponding to the locking request at the end of the locking queue;
    associating one or more instructions with the particular identifier corresponding to the locking request; and
    identifying the particular identifier at the head of the locking queue, and in response, performing said one or more instructions.

2. The method of claim 1, wherein said associating one or more instructions with the particular identifier is performed after another identifier corresponding to a second locking request is added to the locking queue.

3. The method of claim 1, wherein the locking queue contains a plurality of other identifiers corresponding to other items when said generating the locking request to the ordered lock is performed.

4. The method of claim 1, wherein said one or more instructions includes a lock conversion instruction to associate the particular item with a second ordered lock.

5. The method of claim 1, wherein each item of the plurality of items includes a packet.

6. The method of claim 5, wherein said one or more instructions includes a packet gather instruction.

7. The method of claim 5, comprising processing one or more fields of the particular packet to identify a secondary ordered lock; and
    wherein said one or more instructions includes a lock conversion instruction to associate the particular item with a second ordered lock.

8. The method of claim 1, including sending a release lock acknowledgement message; wherein said one or more instructions includes initiating an operation; and wherein said sending the release lock acknowledgement message is performed after performance of the operation is complete.

9. The method of claim 1, including sending a release lock acknowledgement message; wherein said one or more instructions includes initiating an operation; and wherein said sending the release lock acknowledgement message is performed before performance of the operation is complete.

10. A method for maintaining packet ordering, the method comprising:
    employing a particular machine to perform the following steps:
    repeatedly identifying a particular packet of a plurality of packets and in response, generating a locking request to an ordered lock corresponding to the particular packet, wherein the ordered lock maintains a locking queue of identifiers corresponding to the locking requests in the order requested;
    communicating acceptance requests corresponding to packets of the plurality of packets to the ordered lock; and
    repeatedly removing a particular identifier from the head of the locking queue, and granting a locking acceptance request corresponding to the particular identifier if a corresponding said acceptance request was previously generated, or waiting until the locking acceptance request corresponding to the particular identifier is generated and then granting the locking acceptance request corresponding to the particular identifier.

11. The method of claim 10, wherein said locking requests are non-blocking and said acceptance requests are blocking.

12. The method of claim 10, comprising: in response to said granting the locking acceptance request corresponding to a packet, forwarding the packet.

13. The method of claim 10, comprising: in response to said granting the locking acceptance request corresponding to a packet, making a second locking request corresponding to the packet to a particular secondary lock of a plurality of secondary ordered locks, the particular secondary lock being identified based on contents of the packet.

14. The method of claim 10, wherein the locking request corresponding to a first packet of the plurality of packets is generated before the locking request corresponding to the second packet of the plurality of packets, and the acceptance request corresponding to the second packet is made before the acceptance request corresponding to the first packet, and the acceptance request corresponding to the first packet is granted before the acceptance request corresponding to the second packet.

15. An apparatus for processing packets, the apparatus comprising:
a plurality of packet processors;
an ordered lock manager configured to receive lock requests, to receive instruction requests corresponding to said lock requests, and to process instructions corresponding to said lock requests in the order said lock requests are received; wherein said instructions of each particular lock request are said processed after a lock request of said lock requests, immediately prior to said particular lock request in the order said lock requests are said received, is released; and
a distributor, coupled to the plurality of packet processors and the ordered lock manager, configured to receive a packet, make a locking request corresponding to the packet to the ordered lock manager, and to distribute the packet to one or more processors of the plurality of packet processors;
wherein at least one of said one or more processors is configured to communicate a set of instructions corresponding to the packet to the ordered lock manager.

16. The apparatus of claim 15, wherein the set of instructions includes a packet gather instruction.

17. The apparatus of claim 16, wherein the set of instructions includes an instruction for performing a lock release.

18. The apparatus of claim 15, wherein the set of instructions includes a convert instruction for performing a secondary locking request.

19. The apparatus of claim 15, wherein the set of instructions includes an instruction for performing a lock release request.

20. An apparatus for processing packets, the apparatus comprising:
one or more locking mechanisms for operating a plurality of ordered locks, each ordered lock of the plurality of ordered locks including a queue for storing locking items, each locking mechanism of said one or more locking mechanisms configured to receive locking requests and to place indications of the locking requests in corresponding queues of said plurality of ordered locks, and to receive and react to locking accepts and locking releases, the plurality of ordered locks including a root ordered lock and a secondary ordered lock;
a plurality of packet processors;
a packet distributor configured to receive packets, to make root ordered locking requests for each of said packets, and to distribute each of said packets to the plurality of packet processors;
each packet processor of the plurality of packet processors configured to receive a particular packet, to accept a root ordered lock corresponding to the root ordered locking request for the particular packet, to process the packet to identify a secondary lock, to make a locking request corresponding to the secondary ordered lock, and to release the root ordered lock.

21. The apparatus of claim 20, wherein said each packet processor is configured to perform said make the lock request corresponding to the secondary lock after said accepting the root ordered lock corresponding to the root ordered locking request for the particular packet and before said releasing the root ordered lock.

22. An apparatus for maintaining ordering, the apparatus comprising:
means for identifying a particular item of a plurality of items and in response generating a locking request to an ordered lock corresponding to the particular item, wherein the ordered lock is configured to maintain a locking queue of identifiers corresponding to locking requests in the order requested and to place a particular identifier corresponding to the locking request at the end of the locking queue;
means for associating one or more instructions with the particular identifier corresponding to the locking request; and
means for identifying the particular identifier at the head of the locking queue and in response performing said one or more instructions.

23. The apparatus of claim 22, wherein said means for associating one or more instructions with the particular identifier corresponding to the locking request is configured to associate one or more instructions with the particular identifier after another identifier corresponding to a second locking request is added to the locking queue.

24. The apparatus of claim 22, wherein said one or more instructions includes a lock conversion instruction to associate the particular item with a second ordered lock.

25. The apparatus of claim 22, wherein each item of the plurality of items includes a packet.

26. The apparatus of claim 25, wherein said one or more instructions includes a packet gather instruction.

27. The apparatus of claim 25, comprising means for processing one or more fields of the particular packet to identify a secondary ordered lock; and
wherein said one or more instructions includes a lock conversion instruction to associate the particular item with a second ordered lock.

28. An apparatus for maintaining packet ordering, the apparatus comprising:
means for repeatedly identifying a particular packet of a plurality of packets and in response, generating a locking request to an ordered lock corresponding to the particular packet, wherein the ordered lock maintains a locking queue of identifiers corresponding to the locking requests in the order requested;
means for communicating acceptance requests corresponding to packets of the plurality of packets to the ordered lock; and means for repeatedly removing a particular identifier from the head of the locking queue, and granting a locking acceptance request corresponding to the particular identifier if a corresponding said acceptance request was previously generated, or waiting until the locking acceptance request corresponding to the particular identifier is generated and then granting the locking acceptance request corresponding to the particular identifier.

29. The apparatus of claim 28, wherein said locking requests are non-blocking and said acceptance requests are blocking.

30. The apparatus of claim 28, comprising: means for forwarding the packet in response to said granting the locking acceptance request corresponding to a packet.

31. The apparatus of claim 28, comprising: means for making a second locking request corresponding to the packet to a particular secondary lock of a plurality of secondary ordered locks in response to said granting the locking acceptance request corresponding to a packet; and means for identifying the particular secondary lock based on contents of the packet.

32. The apparatus of claim 28, wherein the locking request corresponding to a first packet of the plurality of packets is generated before the locking request corresponding to the second packet of the plurality of packets; and the acceptance request corresponding to the second packet is made before the acceptance request corresponding to the first packet; and the acceptance request corresponding to the first packet is granted before the acceptance request corresponding to the second packet.

33. A tangible computer-readable medium containing computer-executable instructions for performing steps for maintaining ordering, said steps comprising:
    identifying a particular item of a plurality of items and in response, generating a locking request to an ordered lock corresponding to the particular item, wherein the ordered lock is configured to maintain a locking queue of identifiers corresponding to locking requests in the order requested and to place a particular identifier corresponding to the locking request at the end of the locking queue;
    associating one or more instructions with the particular identifier corresponding to the locking request; and
    identifying the particular identifier at the head of the locking queue, and in response, performing said one or more instructions.

34. The computer-readable medium of claim 33, wherein said associating one or more instructions with the particular identifier is performed after another identifier corresponding to a second locking request is added to the locking queue.

35. The computer-readable medium of claim 33, wherein the locking queue contains a plurality of other identifiers corresponding to other items when said generating the locking request to the ordered lock is performed.

36. The computer-readable medium of claim 33, wherein said one or more instructions includes a lock conversion instruction to associate the particular item with a second ordered lock.

37. The computer-readable medium of claim 33, wherein each item of the plurality of items includes a packet.

38. The computer-readable medium of claim 37, wherein said one or more instructions includes a packet gather instruction.

39. The computer-readable medium of claim 37, wherein said steps include processing one or more fields of the particular packet to identify a secondary ordered lock; and wherein said one or more instructions includes a lock conversion instruction to associate the particular item with a second ordered lock.

40. A tangible computer-readable medium containing computer-executable instructions for performing steps for maintaining packet ordering, said steps comprising:
    repeatedly identifying a particular packet of a plurality of packets and in response, generating a locking request to an ordered lock corresponding to the particular packet, wherein the ordered lock maintains a locking queue of identifiers corresponding the locking requests in the order requested;
    communicating acceptance requests corresponding to packets of the plurality of packets to the ordered lock; and
    repeatedly removing a particular identifier from the head of the locking queue, and granting a locking acceptance request corresponding to the particular identifier if a corresponding said acceptance request was previously generated, or waiting until the locking acceptance request corresponding to the particular identifier is generated and then granting the locking acceptance request corresponding to the particular identifier.

41. The computer-readable medium of claim 40, wherein said locking requests are non-blocking and said acceptance requests are blocking.

42. The computer-readable medium of claim 40, wherein said steps include: in response to said granting the locking acceptance request corresponding to a packet, forwarding the packet.

43. The computer-readable medium of claim 40, wherein said steps include: in response to said granting the locking acceptance request corresponding to a packet, making a second locking request corresponding to the packet to a particular secondary lock of a plurality of secondary ordered locks, the particular secondary lock being identified based on contents of the packet.

44. The computer-readable medium of claim 40, wherein the locking request corresponding to a first packet of the plurality of packets is generated before the locking request corresponding to the second packet of the plurality of packets, and the acceptance request corresponding to the second packet is made before the acceptance request corresponding to the first packet, and the acceptance request corresponding to the first packet is granted before the acceptance request corresponding to the second packet.

45. The computer-readable medium of claim 40, wherein said one or more instructions includes initiating an operation; and wherein said steps include sending a release lock acknowledgement message after performance of the operation is complete.

46. The computer-readable medium of claim 40, wherein said one or more instructions includes initiating an operation; and wherein said steps include sending a release lock acknowledgement message before performance of the operation is complete.

47. An apparatus for processing packets, the apparatus comprising:
    a plurality of packet processors;
    an ordered lock manager configured to receive lock requests, to receive instruction requests corresponding to said lock requests, and to process instructions corresponding to said lock requests in the order said lock requests are received; and
    a distributor, coupled to the plurality of packet processors and the ordered lock manager, configured to receive a packet, make a locking request corresponding to the packet to the ordered lock manager, and to distribute the packet to one or more processors of the plurality of packet processors;

wherein at least one of said one or more processors is configured to communicate a set of instructions corresponding to the packet to the ordered lock manager.

48. The apparatus of claim 47, wherein the set of instructions includes a packet gather instruction.

49. The apparatus of claim 48, wherein the set of instructions includes an instruction for performing a lock release.

50. The apparatus of claim 47, wherein the set of instructions includes a convert instruction for performing a secondary locking request.

51. The apparatus of claim 47, wherein the set of instructions includes an instruction for performing a lock release request.

* * * * *

UNITED STATES PATENT AND TRADEMARK OFFICE
CERTIFICATE OF CORRECTION

PATENT NO. : 7,626,987 B2  Page 1 of 1
APPLICATION NO. : 10/706704
DATED : December 1, 2009
INVENTOR(S) : Williams, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1728 days.

Signed and Sealed this

Second Day of November, 2010

David J. Kappos
*Director of the United States Patent and Trademark Office*